United States Patent [19]
Yokota et al.

[11] Patent Number: 4,796,124
[45] Date of Patent: Jan. 3, 1989

[54] INFORMATION RECORDING AND REPRODUCING APPARATUS

[75] Inventors: Yukio Yokota, Kawasaki; Isao Iwase, Ayase; Satoshi Uematsu, Yokohama, all of Japan

[73] Assignee: Kabushiki Kaisha Toshiba, Kanagawa, Japan

[21] Appl. No.: 27,405

[22] Filed: Mar. 18, 1987

[30] Foreign Application Priority Data

Mar. 25, 1986 [JP] Japan .................................. 61-67886
Oct. 9, 1986 [JP] Japan .................................. 61-240588

[51] Int. Cl.$^4$ ............................................. G11B 21/02
[52] U.S. Cl. ......................................... 360/76; 360/2; 235/449
[58] Field of Search ................. 360/2, 76, 81, 83, 101, 360/107; 235/450, 449

[56] References Cited

FOREIGN PATENT DOCUMENTS 52-47704 4/1977 Japan .................................. 360/76
765861 1/1957 United Kingdom .
2016787A 9/1979 United Kingdom .
2070843A 9/1981 United Kingdom .
2076579A 12/1981 United Kingdom .

OTHER PUBLICATIONS

IBM TDB, vol. 19, No. 10, Mar. '77, pp. 3877–3878; Movable Head/Movable Track Accessing; R. Lissner.

Primary Examiner—A. J. Heinz
Attorney, Agent, or Firm—Finnegan, Henderson, Farabow, Garrett, & Dunner

[57] ABSTRACT

In a conventional cash or credit card, since the magnetization angle between the magnetic head and the recording medium formed on the card is fixed, data recorded on the card can easily be discriminated or copied through a card reader for allowing dishonest use of the card. To overcome these problems, data are written or read on or from the card on the basis of a head motion pattern code recorded at the head area of the recording medium. In operation, the read/write head is moved relative to a moving card in accordance with a head motion signal corresponding to a recorded head motion pattern code so that the magnetization angle between the head and the recording medium is intermittently varied in both data recording and reproducing operations.

15 Claims, 6 Drawing Sheets

F I G. 2
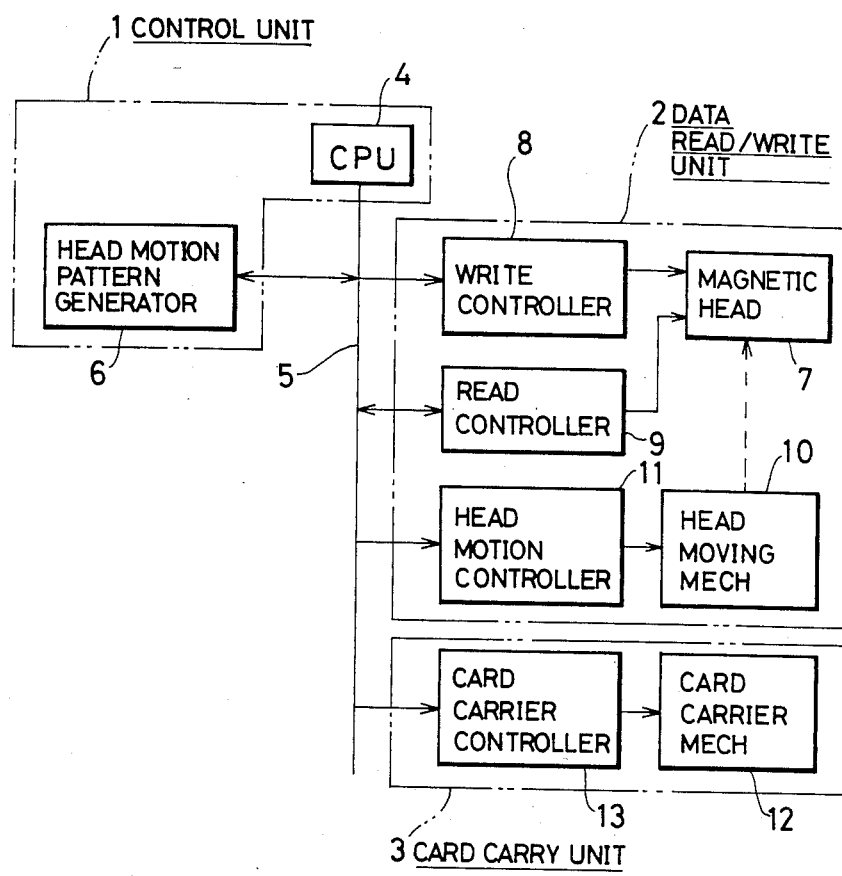

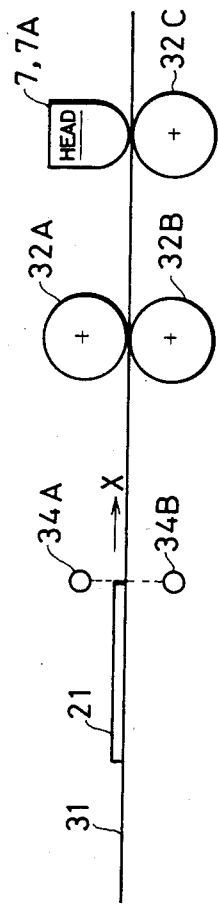
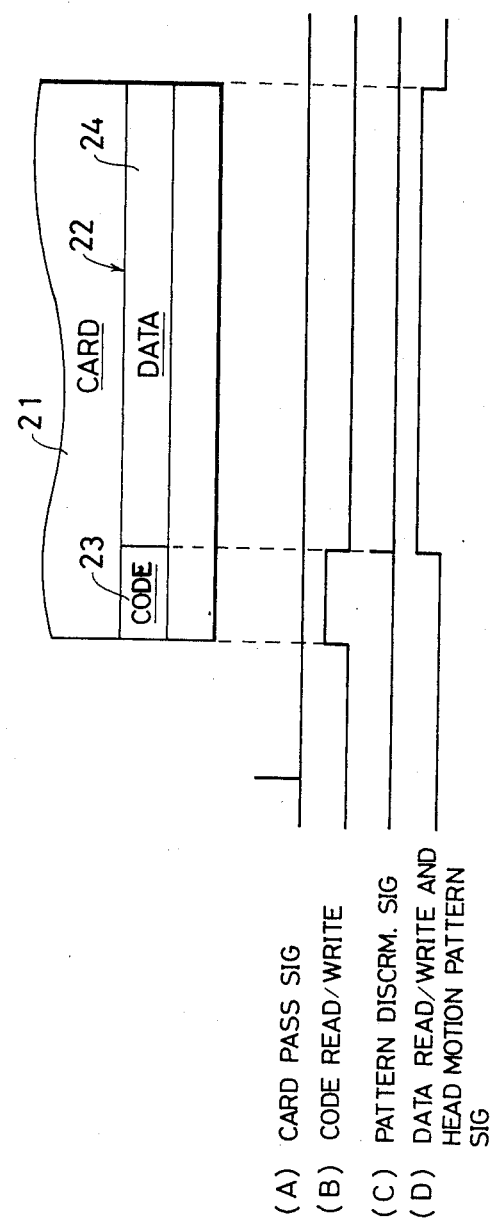
(A) CARD PASS SIG
(B) CODE READ/WRITE
(C) PATTERN DISCRM. SIG
(D) DATA READ/WRITE AND HEAD MOTION PATTERN SIG

INFORMATION RECORDING AND REPRODUCING APPARATUS

BACKGROUND OF THE INVENTION

1. Field of the Invention

The present invention relates to an information recording and reproducing apparatus which can prevent the dishonest use or forgery of various variable cards such as cssh cards, credit cards, etc.

2. Description of the Prior Art

At present, various cards are widely used in the form of cash cards for bank transactions, credit cards for merchandise dealing, etc. A magnetic card among the above-mentioned cards is usually formed with a magnetic striped recording area with a constant width on either side of the magnetic card, in order to record specific information of the card owner in the form of magnetic data.

Prior-art methods of recording data magnetically on the magnetic card will be described with reference to FIGS. 1 (a) and (b). In FIG. 1 (a), the magnetic striped data recording area 30 is divided into a number of data recording areas 31 and data are recorded along a plurality of tracks 32 in the longitudinal direction of the magnetic striped data recording area 30. Here, a magnetic head is arranged relative to the magnetic stripe in such a way that the longitudinal direction of a magnetic gap of the magnetic head is perpendicular to the recording tracks 32.

Here, if an angle subtended by the longitudinal direction of the magnetic head gap and the lateral direction of the magnetic striped recording area 30 is defined as a magnetization angle $\theta$, the magnetization angle of the magnetic stripe 30 shown in FIG. 1 (a) is 0 degrees and that shown in FIG. 1 (b) is $+\theta$.

In the prior-art method of recording and reproducing data on or from a magnetic card, since the magnetization angle is uniformly fixed as 0 (in the case of the stripe shown in FIG. 1 (a)) or $+\theta$ degrees (in the case of the stripe shown in FIG. 1 (b)), the following problems arise: where the magnetic card is applied to a cash card for bank transactions, for instance, in case this card falls into another's hand due to loss or burglary, an identification number recorded on the magnetic card can easily be discriminated through a magnetic card reader. This is because in the prior-art apparatus, since the data recording or reproducing direction (the magnetization direction) of the magnetic head is always kept at a constant angle relative to the movement direction of the recording medium (card), data written on the recording medium can easily be read by gradually changing the angle of the magnetic head relative to the recording medium. As a result, the magnetic card is used dishonestly through a cash dispener. In addition, in the case of the prior-art magnetic recording method of magnetic cards, it is relatively easy to copy other people's information onto another magnetic card by means of a magnetic card reader. In any case, there exists a problem such that cards may be used dishonestly and therefore there exists a need of preventing dishonest use or forgery of cards, because a great quantity of magnetic cards have come into wide use at present.

SUMMARY OF THE INVENTION

With these problems in mind, therefore, it is the primary object of the present invention to provide an information recording and reproducing apparatus, which can prevent the dishonest use or forgery of variable cards in accordance with a special recording method.

To achieve the above-mentioned object, an information recording apparatus having recording head for recording information on a recording medium in relative movmment relationship between the recording head and the recording medium according to the present invention further comprises drive means for moving the recording head to record information on the recording medium so that recording direction of the recording head can be varied relative to a relative movement direction of the recording head and the recording medium.

Further, an information reproducing apparatus having a reproducing head for reproducing information from a recording medium in relative movement relationship between the reproducing head and the recording medium according to the present invention further comprises drive means for moving the reproducing head to reproduce information from the recording medium so that reproducing direction of the reproducing head can be varied relative to a relative movement direction of the reproducing head and the recording medium.

The drive means comprises (a) head motion pattern generating means for generating at least one head motion pattern code signal and a head motion signal corresponding to the head motion pattern code; and (b) head moving means for moving the head relative to the recording medium in response to the head motion signal to vary an angle between the head and a moving direction of the recording medium formed on a card.

The head motion pattern code is written at the head of the recording medium before data are recorded in the same recording medium, and read from the same head thereof before data are reproduced from the same recording medium. The card is moved along a straight line at a constant speed before the head is set to different head angles relative to the recording medium to record or reproduce data on the basis of a pattern code. The head can be set to two symmetric angles or three or more different angles.

In short, the gist of this invention is to vary the recording direction (magnetization direction) relative to the relative movement direction of the recording head and the recording medium in accordance with a pattern code.

BRIEF DESCRIPTION OF THE DRAWINGS

The feature and advantages of the information recording and reproducing apparatus according to the present invention will be more clearly appreciated from the following description of the preferred embodiment of the invention taken in conjunction with the accompanying drawings and in which:

FIG. 1 (b) is an illustration showing another example of prior-art methods of recording or reproducing data on or from a magnetic striped data recording area formed on a card;

FIG. 2 is a schematic block diagram showing an embodiment of the information recording and reproducing apparatus according to the present invention;

FIG. 7 is a diagrammatical view showing a card carrier mechanism;

FIG. 8 is a timing chart fo assistance in explaining the data read/write procedure of the apparatus according to the present invention.

DETAILED DESCRIPTION OF THE PREFERRED EMBODIMENT

The information recording and reproducing apparatus according to the present invention will be described with reference to FIG. 2. The apparatus shown in FIG. 2 is roughly composed of a control unit 1, a data read/write unit 2, and a card carry unit 3.

Figure 1:
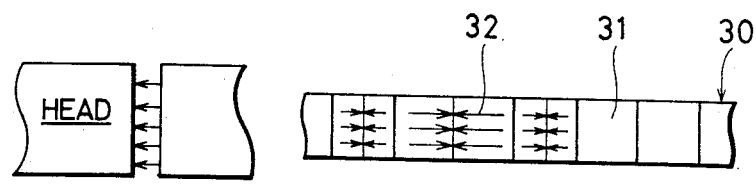
FIG. 1 (a) is an illustration showing an example of prior-art methods of recording or reproducing data on or from a magnetic striped data recording area formed on a card.
Figure 1B:
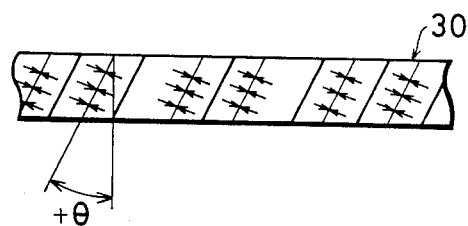
Figure 3:
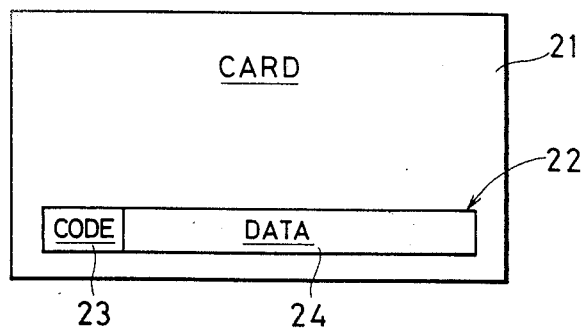
FIG. 3 is a plan views of a card used with the apparatus shown in FIG. 2.

The control unit 1 includes a CPU 4 for controlling the entire operations of the apparatus and a head motion pattern generator 6 for storing a number of head motion pattern code and head motion signals corresponding to the pattern codes as to the magnetization angle between the longitudinal direction of the gap of a magnetic head 7 and the lateral direction of a magnetic striped recording area 22 formed on a card 21 (see FIG. 3). The CPU 4 and the head motion pattern generator 6 are each connected via a CPU bus 5 to the data read/write unit 2 and the card carry unit 3 to transmit or receive various command signals therebetween.

The data read/write unit 2 includes a magnetic head 7 for writing or reading data on or from a magnetic striped recording area 22 formed on a card 21, a write controller 8 connected between the CPU bus 5 and the magnetic head 7 to control the data writing operation for the magnetic striped recording area 22, a read controller 9 connected between the CPU bus 5 and the magnetic head 7 to control the data reading operation for the magnetic recording stripe 22, a head moving mechanism 10 for supporting the magnetic head 7 and varying the magnetization angle between the magnetic head 7 and the striped recording area 22 during the data read/write operations, and a head motion controller 11 connected between the CPU bus 5 and the head moving mechanism 10 to controllably actuate the head moving mechanism 10 in response to head motion signals generated from the head motion pattern generator 6.

The card carry unit 3 includes a card carrier mechanism 12 for setting or rejecting a card inserted into this apparatus to or from a predetermined card settng position, and a card carrier controller 13 connected between the CPU bus 5 and the card carrier mechanism 12 to control the mechanical motion of the card carrier mechanism 12 under control of the CPU 4.

In the above-description, the data read or written on or from the magnetic striped recording area 22 are an identification number of a card owner, a designation of bank with which the card owner has an acoount, etc. Further, the data are written or read on or from the magnetic striped data recording area 24 through the magnetic head 7, when the card is moved along a straight line.

When the longitudinal direction of the magnetic striped recording area 22 is perpendicular to the longitudinal direction of a gap of the magnetic head 7, the magnetization angle $\theta$ is determined as 0 degrees.

FIG. 3 shows an example of cards. This card 21 is formed with a magnetic striped recording area 22 on which various data are written. Further, the numeral 23 denotes a head area of the striped recording area 22 at which a head motion pattern code peculiar to the card owner is to be recorded.

Figure 4:
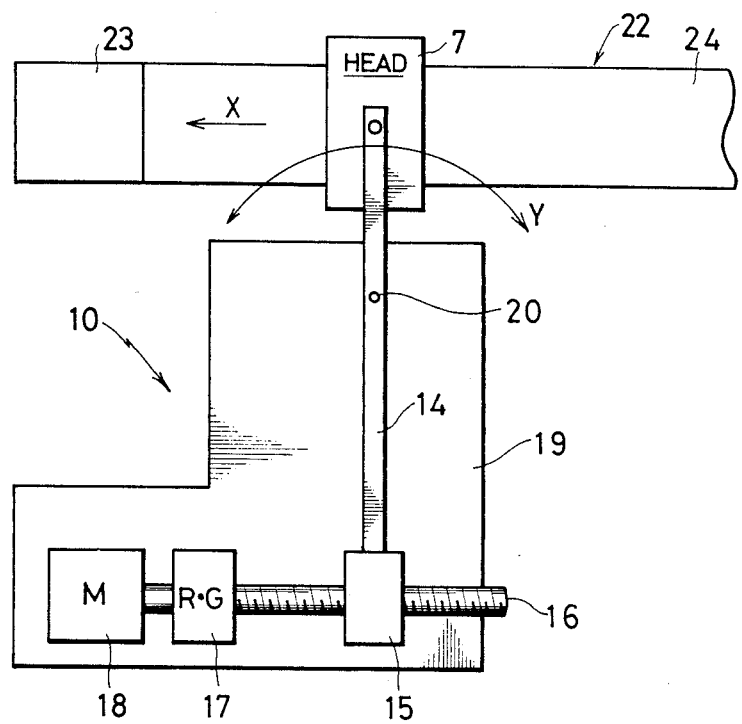
FIG. 4 is a digrammatical plan view showing a head moving mechanism and a magnetic head incorporated in the apparatus shown in FIG. 2.

As shown in FIG. 4, the head moving mechanism 10 comprises a base plate 19, a pin 20 fixed to the base plate 19, a head support arm 14 pivotably supported by the pin 20 and having a magnetic head 7 fixed at one end thereof and a cylindrical nut member 15 fixed at the other end thereof, a motor 18 fixed on the base plate 19, a reduction gear 17 connected to the motor 18, and a bolt member 16 connected to the reduction gear 17 and engaged with the nut member 15.

The motor 18 is driven in either direction in response to the head motion signals given from the head motion pattern generator 6 via the head motion controller 11, so that the bolt member 16 connected to the motor 18 via the reduction gear 17 is rotated to pivot the head support arm 14 in the clockwise or countercloskwise direction Y, with the pin 20 as its pivotal center.

Figure 5A:
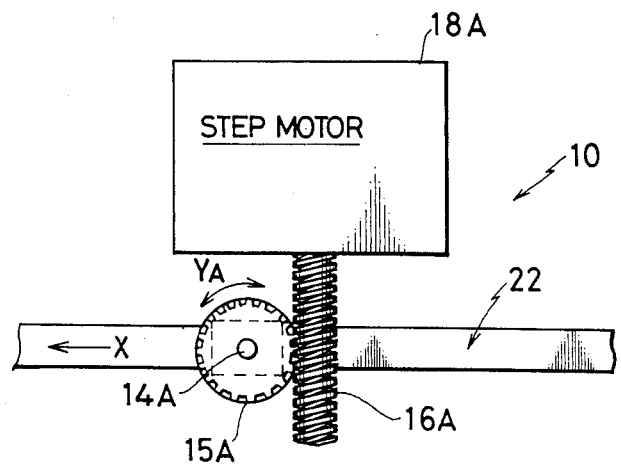
FIG. 5A is a diagrammatical top view showing another head moving mechanism and a magnetic head incorporated in the apparatus shown in FIG. 2.
Figure 5B:
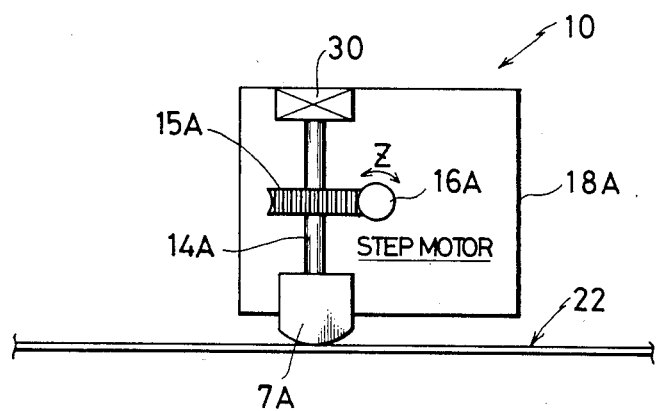
FIG. 5B is a diagrammatical side view showing the same head moving mechanism and the magnetic head shown in FIG. 5A.

FIGS. 5A and 5B show another embodiment of the head moving mechanism 10. This mechanism 10 comprises a step motor 18A, a worm 16A connected to the step motor 18A, a worm wheel 15A engaged with the worm 16A, and a worm wheel shaft 14A supported by a bearing 30 at one end thereof and having a rotatable magnetic head 7A disposed on the magnetic striped recording area 22 of the card 21. In this embodiment, when the worm 16A is pivoted in either direction Z by the step motor 18A, the magnetic head 7A itself is pivoted in the direction $Y_A$ to a predetermined angular position through the worm gear mechanism 16A and 15A.

Figure 6:
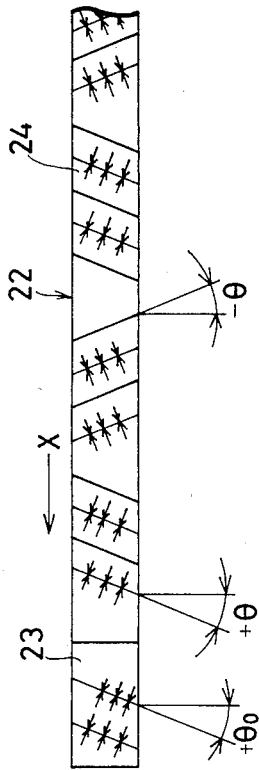
FIG. 6 is an enlarged illustration for assistance in explaining the method of recording and reproducing data on or from a magnetic striped data recording area formed on a card according to the present invention.

Since the magnetic head 7 is moved or rotated relative to the magnetic striped recording area 22, the magnetization angle $\theta$ subtended by the longitudinal direction of the head gap and the lateral direction of the magnetic striped recording area 22 is varied between $+\theta$ and $-\theta$ degrees as shown in FIG. 6.

These magnetization angles are on the order of a few degrees. Further, in FIG. 5, $+\theta°$ denotes an initial angle at which a pattern code is written or read on or from the head area 23 of the striped recording area 22 before data recording or reproducing operation. This angle $+\theta°$ may be equal to the angle $+\theta$.

FIG. 7 shows the card carry mechanism 12 and FIG. 8 is a timing chart for assistance in explaining the recording and reproducing operations. With reference to FIGS. 7 and 8, timing at which data are written or read on or from the striped recording area 22 of a card 21 will be described. When a card 21 is inserted through a slot (not shown) of the apparatus, the card 21 is moved in the direction X by a card carry conveyer 31 driven by three carry rollers 32A, 32B and 32C incorporated in the card carry mechanism 12.

When the card 21 passes through a predetermined point, this card pass is detected by an optical card-pass sensor composed of a light emitting diode 34A and a phototransistor 34B, for instance, and a card pass pulse signal is generated therefrom as shown in (A) of FIG. 8. After a predetermined time has elapsed after the card pass signal was detected, since the head area 23 of the striped recording area 22 reaches the head 7 or 7A, a pattern code is rewritten or read on or from the head area 23 during the period as shown in (B) of FIG. 8. In the case where data are reproduced, the read pattern code is checked as to whether the read pattern code is true or false in comparison with a reference pattern code. If true, a pattern discrimination signal is outputted as shown in (C) of FIG. 8. In response to this pattern discrimination signal, the head 7 or 7A begins to read or write data thereon or therefrom while moving the magnetic head 7 or 7A relative to the striped recording area 22 in accordance with head motion pattern signals corresponding to the read pattern code during the period as shown in (D) of FIG. 8.

The operation of the embodiment according to the present invention will be described hereinbelow.

(a) Data recording operation:

When a user inserts a card 21 into a slot (not shown) of the card carrier mechanism 12, the card 21 is carried at a constant speed toward the magnetic head under the control of the card carrier conroller 13. The optical card-pass sensor 34A and 34B detects the running card and, outputs a card pass signal. A predetermined time has elapsed after the card pass sgnal was outputted, the head motion pattern generator 6 sends a predetermined head motion pattern code previously stored therein to the write controller 8 and the head motion controller 11 via the CPU bus 5 under control of the CPU 4. In response to this head motion pattern code signal, the controller 11 sends a control signal to the motor 18 or 18A incorporated in the card carrier mechanism 12, so that the head support arm 14 or the worm wheel shaft 14A is pivoted to set the the gap position of the head 7 or 7A to an initial angle $\theta°$ in relation to the head area 23 of the striped recording area 22. At the same time, in response to this head motion pattern code signal, the write controller 8 writes a pattern code in the head area 23 of the card striped recording area 22 (see FIG. 6) with the magnetization angle set to an initial angle $+\theta°$, for instance.

Thereupon, control signals corresponding to the selected head motion pattern code are applied in sequence from the head motion pattern generator 6 to the head moving mechanism 10 via the head motion controller 11 to move and set the magnetic head 7 or 7A to predetermined head positions by the motor 18 or 18A. Simultaneously, various data peculiar to the card owner are sent from the CPU 4 to the magnetic head 7 or 7A through the write controller 8. Therefore, the data peculiar to the card owner are written at the data recording area 24 of the striped recording area 22 under the condition that the magnetization angle is set to either one of two angles of $+\theta$ and $-\theta$ degrees, for instance, as depicted in FIG. 6.

(b) Data reproducing operation:

When a user inserts a card 21 into a slot (not shown) of the card carrier mechanism 12, the card 21 is carried at a constant speed toward the magnetic head under the control of the card carrier controller 3. The optical card-pass sensor 34A and 34B detects the running card and outputs a card pass signal. A predetermined time has elapsed after the card pass signal was outputted, the head motion pattern generator 6 sends a predetermined head motion pattern code signal to the read controller 9 and the head motion controller 11 via the CPU bus 5. In response to this head motion pattern code signal, the controller 11 sends a control signal to the motor 18 or 18A incorporated in the card carrier mechanism 12, so that the head support arm 14 or the worm wheel shaft 14A is pivoted to set the gap position of the head 7 or 7A to an initial angle $\theta°$ in relation to the head area 23 of the striped reoording area 22. At the same time, in response to this head motion pattern code signal, the read controller 9 sends a control signal to the magnetic head 7 or 7A to read the pattern code recorded in the head area 23 of the striped recording area 22 with the magnetization angle set to an initial angle $+\theta°$, for instance. The read pattern code is sent to the head motion pattern generator 6 under control of the CPU 4 to check the kind of pattern code. Once the pattern code of the inserted card has been checked, control signals corresponding to the specified pattern code are applied in sequence from the head motion pattern generator 6 to the head moving mechanism 10 via the head motion controller 11 to set the magnetic head 7 or 7A to predetermined head positions by the motor 18 or 18A. Simultaneously, data recorded at the data recording area 24 of the striped recording area 22 are read under the condition that the magnetization angle is set to either one of two angles of $+\theta$ and $-\theta$ degrees, which are the same as those determined during the data recording operation.

The data read from the card are sent to the CPU 4 to check the truth or falsehood of the inserted card. When the card is determined to be true, the CPU 4 proceeds to the succeeding step in response to the card owner's request. However, in case the card is determined to be false or when the magnetic head 7 or 7A cannot read the data recorded on the card, because the data are written at magnetization angles different from those determined during data reproducing operation, the CPU 4 interrupts the succeeding operation, rejects the card or sounds an alarm indicative of the fact that the card 21 is not true.

Figure 9:
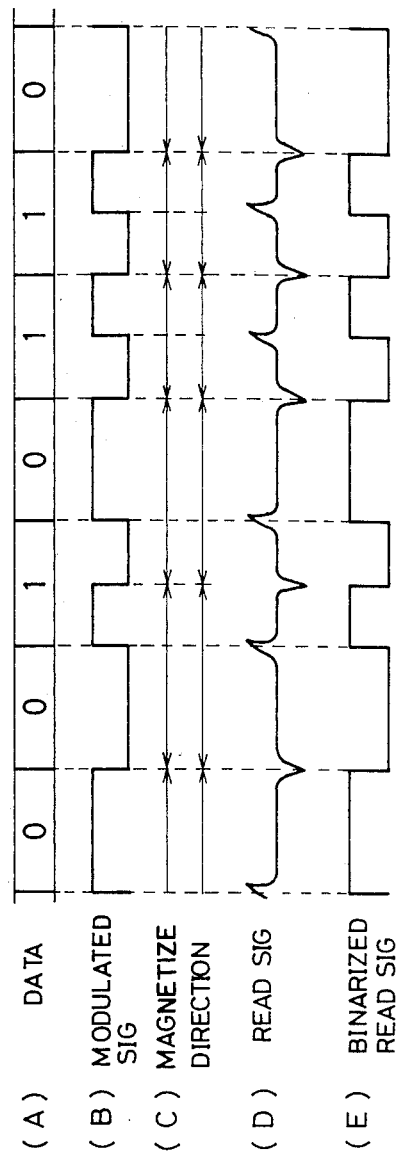
FIG. 9 is a timing chart for assistance in explaining an F/2F method adoptable for the apparatus according to the present invention.

The basic operation has been described above, however, without being limited thereto, various modifications can be realized as follows:

FIG. 9 shows the method of recording or reproducing data in accordance with F/2F method. This F/2F method is a kind of bit modulation technique. Bits are a minimum unit to construct a data. When this F/2F method is adopted, the magnetization angle is varied at a frequency F when data bits are 0 but at a frequency $2 \times F$ when data bits are 1, where the frequency F is a bit rate frequency. In this method, the step motor 18A shown in FIGS. 5A and 5B is rotated by one step in either direction, the magnetization angle is set to either $+\theta$ or $-\theta$ degrees, as shown in FIG. 6, in synchronism with the bit signals of a data. In FIG. 9, a series of data bits (A) are modulated as shown in (B) to determine the magnetiaation directions as shown in (C) in response to the data bits (A). Where the modulated data are read through the magnetic head, the read signals as shown in (D) can be obtained. These signals are converted into binarized read signals as shown in (E).

Further, it is possible to determine the leftward magnetization angle $+\theta$ to be different from the rightward angle $-\theta$ as $+\theta \neq -\theta$. Furthermore, it is also possible to set the magnetic head to three or more magnetization angles.

Further, it is possible to adopt an electromagnet in place of the drive motor 18 or the stepmotor 18A.

Furthermore, a magnetic card has mainly been described; however, the apparatus according to the present invention can be applied to any kinds of cards such as laser memory cards from which data are reproduced by means of a light emitting diode (semiconductor light emitting element) and a charge coupled device (light to electricity transducing element).

What is claimed is:

1. An information recording apparatus, comprising:
   a recording head for recording information on a recording medium on a card when the recording medium is moving with respect to the recording head; and
   drive means for moving the recording head relative to the recording medium so that an angle between a longitudinal direction of the recording head and a lateral direction of the recording medium can be varied, wherein the drive means includes
   (a) head motion pattern generating means for generating at least one head motion pattern code signal and a head motion signal corresponding to the head motion pattern code signal, and
   (b) head moving means for moving the recording head relative to the recording medium in response to the head motion signal to vary the angle between the longitudinal direction of the recording head and the lateral direction of the recording medium.

2. The information recording apparatus as set forth in claim 1, wherein the head motion pattern code signal is written at a head of the recording medium before data are recorded in the same recording medium, and read from the head of the recording medium before data are reproduced from the same recording medium.

3. The information recording apparatus as set forth in claim 2, wherein data recorded on the recording medium are reproduced only when the head motion pattern code written at the head of the recording medium is determined true in comparison with a reference pattern code.

4. The information recording apparatus as set forth in claim 1, wherein the angle between the recording head and the recording medium is set to two symmetric values of $\pm \theta$ degrees relative to the recording medium.

5. The information recording apparatus as set forth in claim 1, wherein the angle between the recording head and the recording medium is set to three or more different values.

6. An information reproducing apparatus, comprising:
   a reproducing head for reproducing information on a recording medium on a card when the recording medium is moving with respect to the reproducing head; and
   drive means for moving the reproducing head relative to the recording medium so that an angle between a longitudinal direction of the reproducing head and a lateral direction of the recording medium can be varied, wherein the drive means includes
   (a) head motion pattern generating means for generating at least one head motion pattern code signal and a head motion signal corresponding to the head motion pattern code signal, and
   (b) head moving means for moving the reproducing head relative to the recording medium in response to the head motion signal to vary the angle between the longitudinal direction of the reproducing head and the lateral direction of the recording medium.

7. The information reproducing apparatus as set forth in claim 6, wherein the head motion pattern code signal is written at a head of the recording medium before data are recorded in the same recording medium, and read from the head of the recording medium before data are reproduced from the same recording medium.

8. The information reproducing apparatus as set forth in claim 7, wherein data recorded on the recording medium are reproduced only when the head motion pattern code written at the head of the recording medium is determined true in comparison with a reference pattern code.

9. The information reproducing apparatus as set forth claim 6, wherein the angle between the reproducing head and the recording medium is set to two symmetric values of $\pm \theta$ degrees relative to the recording medium.

10. The information reproducing apparatus as set forth in claim 6, wherein the angle between the reproducing head and the recording medium is set to three or more different values.

11. An information recording/reproducing apparatus comprising:
    a recording medium on a card;
    a recording/reproducing head for recording/reproducing information on/from said recording medium when said recording medium is moving with respect to said recording/reproducing head; and
    means for driving said recording/reproducing head having:
    (a) head motion pattern generating means for generating at least one head motion pattern code signal and a head motion signal corresponding to the head motion pattern code signal, and
    (b) head moving means for moving said recording/reproducing head relative to said recording medium in response to the head motion signal to vary an angle between a longitudinal direction of said recording/reproducing head and a lateral direction of said recording medium.

12. The information recording/reproducing apparatus as set forth in claim 11, wherein the head motion pattern code signal is written at a head of the recording medium before data are recorded in the same recording medium, and read from the head of the recording medium before data are reproduced from the same recording medium.

13. The information recording/reproducing apparatus as set forth in claim 12, wherein data recorded on the recording medium are reproduced only when the head motion pattern code written at the head of the recording medium is determined true in comparison with a reference pattern code.

14. The information recording/reproducing apparatus as set forth in claim 11, wherein the angle between the recording/reproducing head and the recording medium is set to two symmetric values of $\pm \theta$ degrees relative to the recording medium.

15. The information reproducing apparatus as set forth in claim 11, wherein the angle between the recording/reproducing head and the recording medium is set to at least three different values.

* * * * *